US009673733B2

(12) United States Patent
Matsuoka et al.

(10) Patent No.: US 9,673,733 B2
(45) Date of Patent: Jun. 6, 2017

(54) CONTROL APPARATUS FOR PHOTOVOLTAIC INVERTER

(71) Applicant: Toshiba Mitsubishi-Electric Industrial Systems Corporation, Chuo-ku (JP)

(72) Inventors: Yuji Matsuoka, Tokyo (JP); Ruben Alexis Inzunza Figueroa, Tokyo (JP); Tatsuaki Ambo, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/002,829

(22) Filed: Jan. 21, 2016

(65) Prior Publication Data

US 2016/0141978 A1 May 19, 2016

Related U.S. Application Data

(63) Continuation of application No. PCT/JP2013/069886, filed on Jul. 23, 2013.

(51) Int. Cl.
*H02M 7/539* (2006.01)
*H02M 7/537* (2006.01)
(Continued)

(52) U.S. Cl.
CPC ............ *H02M 7/537* (2013.01); *H02J 3/1842* (2013.01); *H02J 3/385* (2013.01); *Y02E 10/58* (2013.01); *Y02E 40/22* (2013.01)

(58) Field of Classification Search
CPC G05F 1/67; Y02E 10/58; H02J 3/385; H02M 7/539; H02M 1/12
See application file for complete search history.

(56) References Cited

U.S. PATENT DOCUMENTS 6,339,538 B1 * 1/2002 Handleman ............... G05F 1/67
136/293
8,611,117 B2 * 12/2013 Kim .................. H01L 31/02021
323/906
(Continued)

FOREIGN PATENT DOCUMENTS

DE 10 2011 054 939 A1 5/2013
JP 7-194134 7/1995
(Continued)

OTHER PUBLICATIONS

English Translation of International Search Report issued Aug. 20, 2013 in PCT/JP2013/069886, filed Jul. 23, 2013.
(Continued)

*Primary Examiner* — Gary L Laxton
(74) *Attorney, Agent, or Firm* — Oblon, McClelland, Maier & Neustadt, L.L.P.

(57) ABSTRACT

There is provided a control apparatus for a photovoltaic inverter. The control apparatus includes a system voltage detector, a DC voltage detector that detects a DC voltage applied to the inverter, an output voltage deficiency detector that detects an output voltage deficiency of the inverter based on the system voltage and the DC voltage, an output-current detector, an output-current distortion detector that detects distortion of the output current based on a harmonic included in the output current, a MPPT controller, and an output-current distortion controller that performs control to set the DC voltage applied to the inverter to a voltage at a power point less than a maximum power point when the output voltage deficiency is detected and the distortion of the output current is detected.

9 Claims, 4 Drawing Sheets

(51) Int. Cl.
*H02J 3/18* (2006.01)
*H02J 3/38* (2006.01)
*G05F 1/67* (2006.01)

(56) References Cited

U.S. PATENT DOCUMENTS

2010/0157632 A1* 6/2010 Batten ................ H02M 7/4807
　　　　　　　　　　　　　　　　　　　　363/74
2015/0200607 A1* 7/2015 Fujii ................ H02M 7/53871
　　　　　　　　　　　　　　　　　　　　363/97

FOREIGN PATENT DOCUMENTS

JP　　8-126344　　5/1996
JP　　11-122818　　4/1999

OTHER PUBLICATIONS

Extended European Search Report issued Feb. 27, 2017 in Patent Application No. 13889814.3.

* cited by examiner

CONTROL APPARATUS FOR PHOTOVOLTAIC INVERTER

CROSS REFERENCE TO RELATED APPLICATIONS

This application is a Continuation Application of PCT Application No. PCT/JP2013/069886, filed Jul. 23, 2013, the entire contents of which are incorporated herein by reference.

BACKGROUND OF THE INVENTION

1. Field of the Invention

The present invention relates generally to a control apparatus for a photovoltaic inverter.

2. Description of the Related Art

In general, photovoltaic power systems include inverters for interconnecting with alternating-current (AC) power systems. The inverters are configured to convert direct-current (DC) power generated by photovoltaic cells to AC power synchronized with the AC power systems and supply the AC power to the AC power systems.

However, disadvantageously, there are some cases in a photovoltaic inverter where, when there is an output voltage deficiency of the inverter due to variations in system voltage or the like, an output current of the inverter becomes distorted and flows backward (see Patent Literature 1).

CITATION LIST

Patent Literature

Patent Literature 1
JP 11-122818 A

BRIEF SUMMARY OF THE INVENTION

An object of the present invention is to provide a control apparatus for a photovoltaic inverter, the control apparatus capable of preventing distortion of an output current caused by an output voltage deficiency of the inverter.

In accordance with an aspect of the present invention, there is provided a control apparatus for a photovoltaic inverter that converts power generated by sunlight into AC power interconnecting with an AC power system. The control apparatus comprises a system voltage detector configured to detect a system voltage of the AC power system; a DC voltage detector configured to detect a DC voltage applied to the inverter; an output voltage deficiency detector configured to detect an output voltage deficiency of the inverter based on the system voltage detected by the system voltage detector and the DC voltage detected by the DC voltage detector; an output-current detector configured to detect an output current of the inverter; an output-current distortion detector configured to detect distortion of the output current based on a harmonic included in the output current detected by the output-current detector; a maximum power point tracking controller configured to perform maximum power point tracking control on the inverter; and an output-current distortion controller configured to perform control to set the DC voltage applied to the inverter to a voltage at a power point less than a maximum power point of the maximum power point tracking control when the output voltage deficiency is detected by the output voltage deficiency detector and the distortion of the output current is detected by the output-current distortion detector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the accompanying drawings.

First Embodiment

Figure 1:
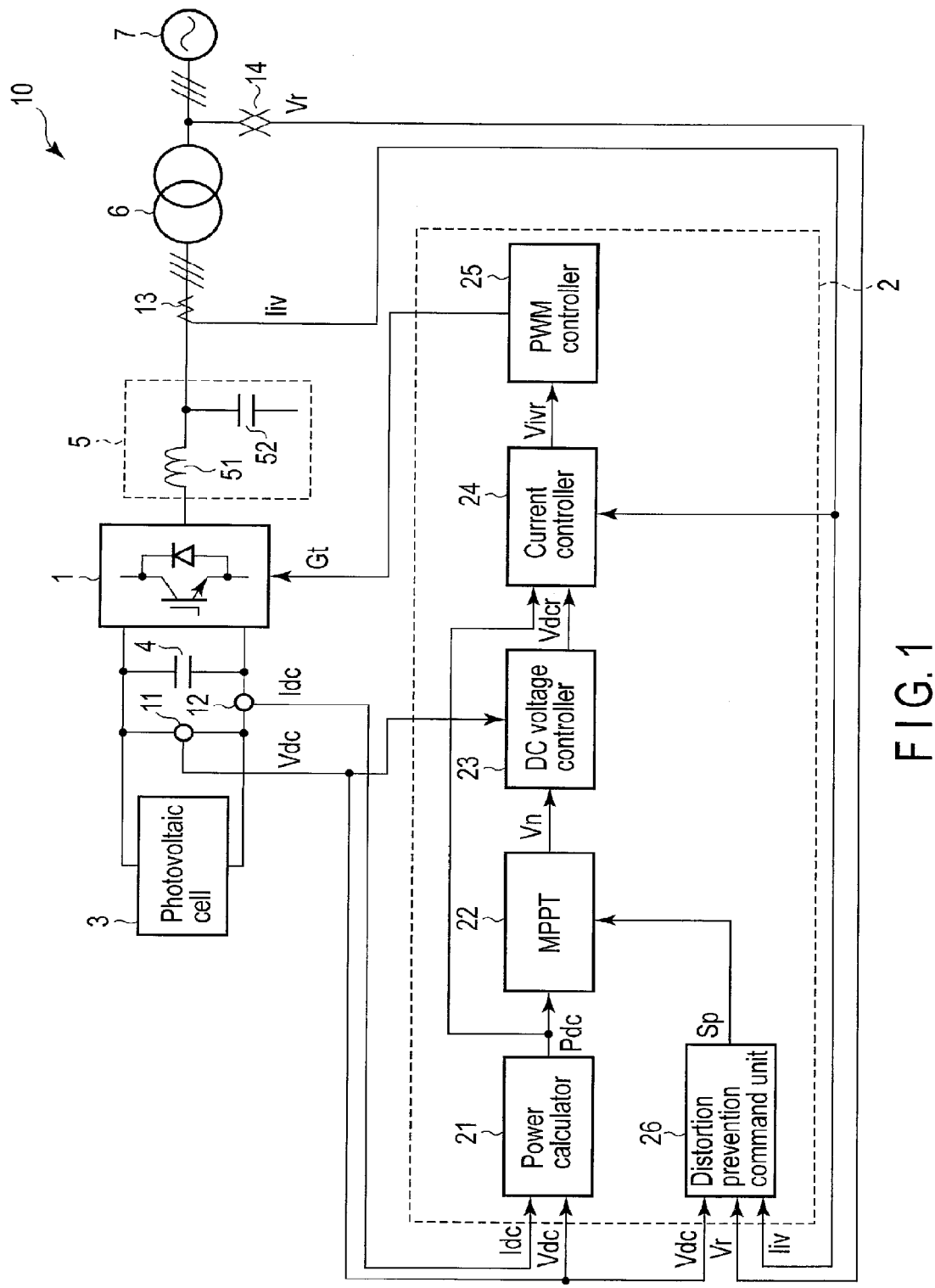
FIG. 1 is a block diagram showing the structure of a photovoltaic power system which adopts a control apparatus for an inverter according to a first embodiment of the present invention.

FIG. 1 a block diagram showing the structure of a photovoltaic power system 10 which adopts a control apparatus 2 for an inverter 1 according to a first embodiment of the present invention. Note that the same portions in the drawings will be denoted by the same reference numbers, the detailed explanations thereof will be omitted, and that different portions in the drawings will be mainly described.

The photovoltaic power system 10 includes the inverter 1, the control apparatus 2, a photovoltaic cell 3, a smoothing capacitor 4, an AC filter 5, an interconnection transformer 6, an AC power system 7, a DC voltage detector 11, a DC current detector 12, an AC current detector 13, and an AC voltage detector 14.

The photovoltaic cell 3 is a cell which generates power by light (sunlight). The photovoltaic cell 3 supplies the generated power to the inverter 1.

The inverter 1 converts the DC power supplied from the photovoltaic cell 3 into AC power synchronized with the AC power system 7. The inverter 1 supplies the converted AC power to the AC power system 7 via the interconnection transformer 6. The inverter 1 is controlled by pulse width modulation (PWM). In the inverter 1, the power conversion is controlled by a gate signal Gt output from the control apparatus 2. The inverter 1 is, for example, a power conditioning system (PCS).

The smoothing capacitor 4 is provided on the DC side (input side) of the inverter 1. The smoothing capacitor 4 smooths the DC voltage supplied from the photovoltaic cell 3 to the inverter 1.

The AC filter 5 includes a reactor 51 and a capacitor 52. The AC filter 5 suppresses a harmonic output from the inverter 1.

The DC voltage detector 11 is a detector which measures a voltage Vdc on the DC side of the inverter 1 (voltage of the smoothing capacitor 4). The DC voltage detector 11 outputs the detected DC voltage Vdc to the control apparatus 2.

The DC current detector 12 is a detector which measures a current Idc flowing into the DC side of the inverter 1. The DC current detector 12 outputs the detected DC current Idc to the control apparatus 2.

The AC current detector 13 is a detector which measures a current Iiv on the AC side (output side) of the inverter 1. The AC current detector 13 outputs the detected AC current Iiv to the control apparatus 2.

The AC voltage detector 14 is a detector which measures a system voltage Vr of the AC power system 7. The AC voltage detector 14 outputs the detected system voltage Vr to the control apparatus 2.

The control apparatus 2 includes a power calculator 21, a maximum power point tracking (MPPT) 22, a DC voltage controller 23, a current controller 24, a PWM controller 25 and a distortion prevention command unit 26.

The power calculator 21 calculates DC power Pdc based on the DC voltage Vdc detected by the DC voltage detector 11 and the DC current Idc detected by the DC current detector 12. The power calculator 21 outputs the calculated DC power Pdc to the MPPT 22.

The MPPT 22 outputs, based on the DC power Pdc calculated by the power calculator 21, a voltage increase/decrease signal Vn which increases/decreases a DC voltage to the DC voltage controller 23. During normal operation (in the case of not receiving any signal Sp from the distortion prevention command unit 26), the MPPT 22 outputs the voltage increase/decrease signal Vn determined by maximum power point tracking control. In the case of receiving the signal Sp from the distortion prevention command unit 26, the MPPT 22 outputs the voltage increase/decrease signal Vn determined in such a manner as to prevent distortion of the waveform of the output current Iiv of the inverter 1 instead of performing the maximum power point tracking control.

Figure 2:
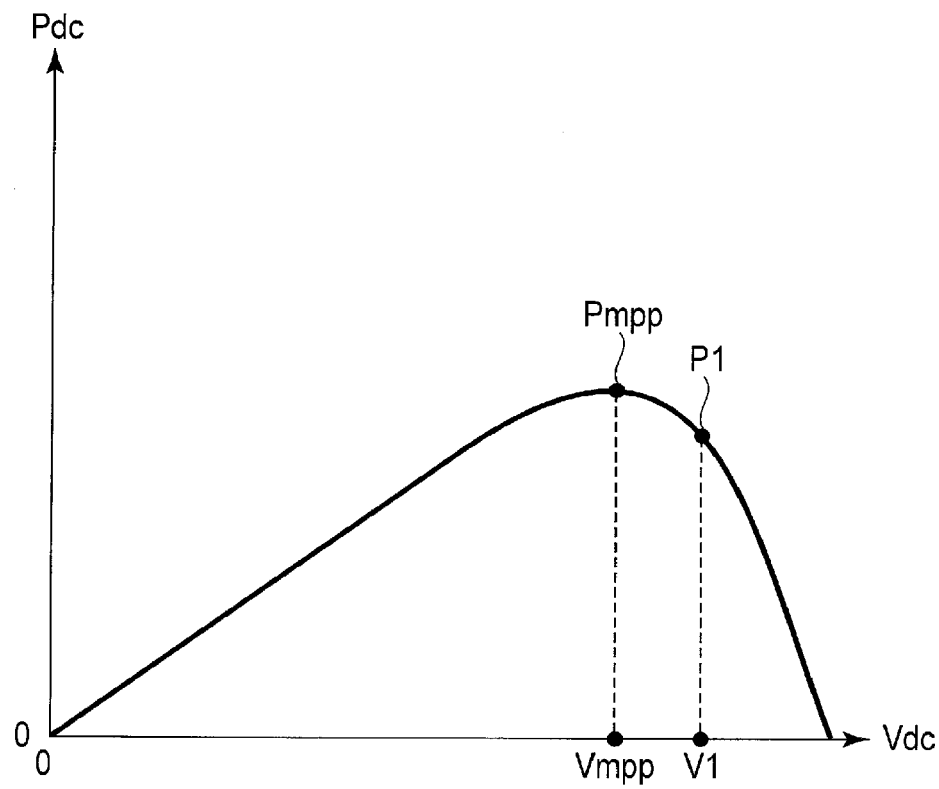
FIG. 2 is a characteristic diagram showing the characteristics of power generated by a photovoltaic cell according to the first embodiment.

With reference to FIG. 2, the control of the DC voltage Vdc performed by the MPPT 22 will be described below. FIG. 2 is a characteristic diagram showing the characteristics of power generated by the photovoltaic cell 3 according to the present embodiment.

The MPPT 22 performs the control (maximum power point tracking control) to track a voltage (maximum power point voltage) Vmpp at a maximum power point Pmpp shown in FIG. 2 in the following manner.

First, the MPPT 22 measures the DC power Pdc at a certain voltage Vdc.

Then, the MPPT 22 outputs the voltage increase/decrease signal Vn which increases/decreases the DC voltage Vdc by a voltage predetermined for one step. After increasing/decreasing the DC voltage Vdc, the MPPT 22 measures the DC power Pdc. The MPPT 22 compares the previously measured DC power Pdc and the newly measured DC power Pdc with each other.

If it is determined as a result of comparison that the newly measured DC power Pdc is greater, the MPPT 22 outputs the voltage increase/decrease signal Vn the same as the previously output voltage increase/decrease signal Vn. That is, if the previously output voltage increase/decrease signal Vn is a signal for voltage increase, the voltage increase/decrease signal Vn is output as a signal for voltage increase once again. If the previously output voltage increase/decrease signal Vn is a signal for voltage decrease, the voltage increase/decrease signal Vn is output as a signal for voltage decrease once again. On the other hand, if it is determined that the newly measured DC power Pdc is less, the MPPT 22 outputs the voltage increase/decrease signal Vn different from the previously output voltage increase/decrease signal Vn.

By repeating the above-described procedure, the MPPT 22 controls the DC voltage Vdc to be approximately the maximum power point voltage Vmpp at all times.

Into the DC voltage controller 23, there are input the DC voltage Vdc detected by the DC voltage detector 11 and the voltage increase/decrease signal Vn determined by the MPPT 22. The DC voltage controller 23 calculates a DC voltage command value Vdcr for controlling the DC voltage Vdc based on the DC voltage Vdc and the voltage increase/decrease signal Vn. The DC voltage controller 23 outputs the calculated DC voltage command value Vdcr to the current controller 24.

Into the current controller 24, there are input the output current Iiv detected by the AC current detector 13, the DC power Pdc calculated by the power calculator 21, and the DC voltage command value Vdcr calculated by the DC voltage controller 23. The current controller 24 calculates a voltage command value Vivr for controlling the output voltage of the inverter 1 based on the output current Iiv, the DC power Pdc and the DC voltage command value Vdcr. The current controller 24 outputs the calculated voltage command value Vivr to the PWM controller 25.

Into the PWM controller 25, the voltage command value Vivr calculated by the current controller 24 is input. The PWM controller 25 generates the gate signal Gt to drive a switching element of the inverter 1 in such a manner that the output voltage of the inverter 1 tracks the voltage command value Vivr. The PWM controller 25 performs the PWM control on the inverter 1 by the generated gate signal Gt.

Into the distortion prevention command unit 26, there are input the DC voltage Vdc detected by the DC voltage detector 11, the output current Iiv of the inverter 1 detected by the AC current detector 13 and the system voltage Vr of the AC power system 7 detected by the AC voltage detector 14. The distortion prevention command unit 26 determines whether it is necessary to perform control to prevent distortion of the output current Iiv or not based on the DC voltage Vdc, the output current Iiv and the system voltage Vr. If it is determined that there is a need for control to prevent distortion of the output current Iiv, the distortion prevention command unit 26 outputs to the MPPT 22 a control signal Sp for performing the control.

Figure 3:
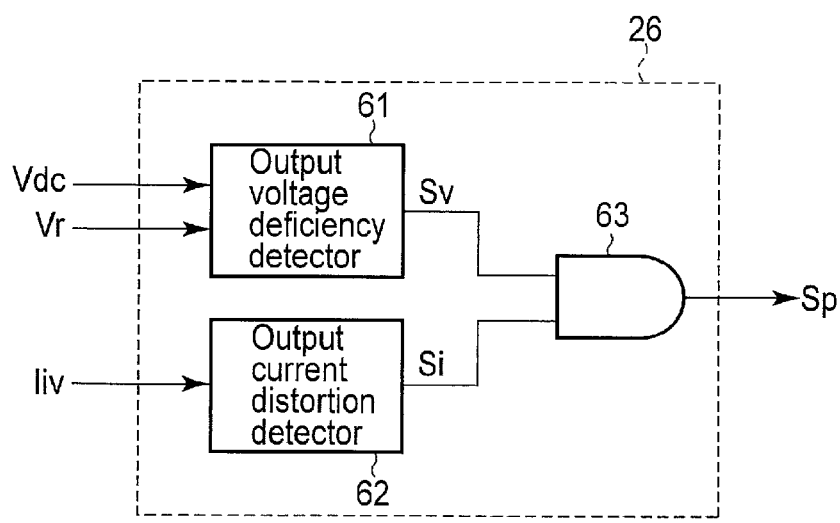
FIG. 3 is a block diagram showing the structure of a distortion prevention command unit according to the first embodiment.

FIG. 3 is a block diagram showing the structure of the distortion prevention command unit 26 according to the present embodiment.

The distortion prevention command unit 26 includes an output voltage deficiency detector 61, an output-current distortion detector 62 and an AND gate 63.

The output voltage deficiency detector 61 determines whether there is an output voltage deficiency of the inverter 1 or not based on the DC voltage Vdc and the system voltage Vr. The output voltage deficiency detector 61 determines that there is an output voltage deficiency if the DC voltage Vdc is less than a reference voltage determined in accordance with the system voltage Vr. The reference voltage may be any voltage obtained by calculation based on the system voltage Vr. For example, the reference voltage is calculated by multiplying a peak system voltage Vr by a predetermined coefficient. If it is determined that there is an output voltage deficiency, the output voltage deficiency detector 61 outputs a detection signal Sy indicating an output voltage deficiency to the AND gate 63.

For example, when the interconnection transformer 6 has a transformer ratio of 1:1 and if the DC voltage Vdc is less than the peak system voltage Vr, the output voltage deficiency detector 61 determines that there is an output voltage deficiency. That is, when the DC voltage Vdc falls below a theoretical minimum necessary voltage for outputting from the inverter 1 a voltage equivalent to the system voltage Vr, the output voltage deficiency detector 61 determines that there is an output voltage deficiency. Therefore, in the case of the inverter 1 operating under triple-superposition control, there is not necessarily an output voltage deficiency of the inverter 1 even if the DC voltage Vdc is less than the peak system voltage Vr.

The output-current distortion detector 62 determines whether the waveform of the output current Iiv is distorted or not. If it is determined that the output current Iiv is distorted, the output-current distortion detector 62 outputs a detection signal Si indicating the detection of the distortion of the output current Iiv to the AND gate 63.

The output-current distortion detector 62 detects distortion of the output current Iiv in the following manner. First, the output-current distortion detector 62 extracts a harmonic superposed on the output current Iiv. If the extracted harmonic (for example, the fifth harmonic) is greater than or equal to a predetermined ratio (for example, 5%) with respect to a fundamental harmonic, the output-current distortion detector 62 determines that the output current Iiv is distorted. Here, the harmonic may be an even harmonic or an odd harmonic, and it is also possible to extract various kinds of harmonics.

The AND gate 63 outputs, if receiving both the detection signal Sv detected by the output voltage deficiency detector 61 and the detection signal Si detected by the output-current distortion detector 62, the control signal Sp for performing control to prevent distortion of the output current Iiv to the MPPT 22.

With reference to FIG. 2, the operation which the MPPT 22 performs when receiving the control signal Sp will be described below.

The MPPT 22 performs, when not receiving any control signal Sp, the maximum power point tracking control, and thus the DC voltage Vdc is controlled to be approximately the voltage Vmpp at the maximum power point Pmpp.

The MPPT 22 outputs, when receiving the control signal Sp, the voltage increase/decrease signal Vn to increase the DC voltage Vdc regardless of the maximum power point Pmpp. By doing this, although the power Pdc output from the photovoltaic cell 3 decreases, the DC voltage Vdc increases on the contrary. That is, the MPPT 22 increases the DC voltage Vdc by reducing the power Pdc generated by the photovoltaic cell 3. The MPPT 22 increases the DC voltage Vdc until the MPPT 22 no longer receives the control signal Sp. In this way, the MPPT 22 controls the inverter 1 on a voltage V1 at a power point P1 which is less than the maximum power point Pmpp.

The MPPT 22 changes the control method back to the maximum power point tracking control when no longer receiving the control signal Sp (when no longer detecting the output voltage deficiency of the inverter 1 by the output voltage deficiency detector 61, or no longer detecting the distortion of the output current Iiv of the inverter 1 by the output-current distortion detector 62). Note that further conditions of changing the control method back to the maximum power point tracking control may be added. For example, the condition to be added may be a lapse of a predetermined time, a time when the system voltage Vr becomes less than a predetermined voltage, or a time when the power Pdc generated by the photovoltaic cell 3 exceeds a predetermined power, or may be any other condition.

According to the present embodiment, it is possible to prevent distortion of the waveform of the output current Iiv by detecting an output voltage deficiency and distortion of the waveform of the output current Iiv of the inverter 1, stopping the maximum power point tracking control, and increasing the DC voltage Vdc as reducing the power Pdc to be generated by the photovoltaic cell 3.

Second Embodiment

Figure 4:
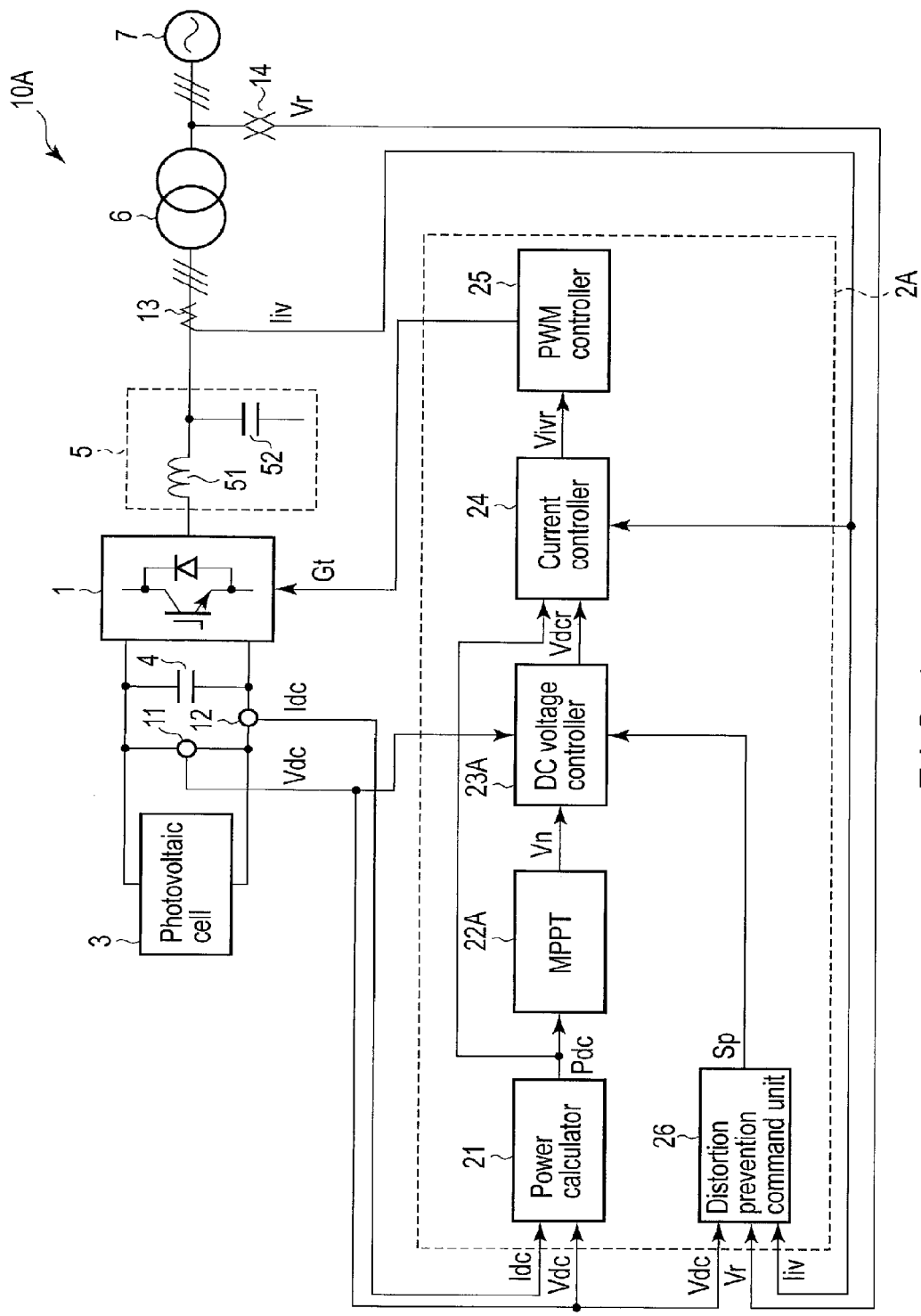
FIG. 4 is a block diagram showing the structure of a photovoltaic power system which adopts a control apparatus for an inverter according to a second embodiment of the present invention.

FIG. 4 is a block diagram showing the structure of a photovoltaic power system 10A which adopts a control apparatus 2A of the inverter 1 according to a second embodiment of the present invention.

The photovoltaic power system 10A includes a control apparatus 2A instead of the control apparatus 2 for the photovoltaic power system 10 according to the first embodiment shown in FIG. 1. The control apparatus 2A includes an MPPT 22A instead of the MPPT 22 of the control apparatus 2 according to the first embodiment, and a DC voltage controller 23A instead of the DC voltage controller 23 of the control apparatus 2 according to the first embodiment. The rest of the structure is the same as that of the first embodiment.

The MPPT 22A does not receive a control signal Sp from a distortion prevention command unit 26 and performs maximum power point tracking control at all times. The rest of the configuration of the MPPT 22A is similar to that of the MPPT 22 according to the first embodiment.

The DC voltage controller 23A receives the control signal Sp from a distortion prevention command unit 26. The DC voltage controller 23A controls to prevent distortion of an output current Iiv when receiving the control signal Sp. During normal operation (in the case of not receiving any control signal Sp), the DC voltage controller 23A controls a DC voltage Vdc based on a voltage increase/decrease signal Vn received from the MPPT 22A in a manner similar as that of the DC voltage controller 23 according to the first embodiment.

Figure 5:
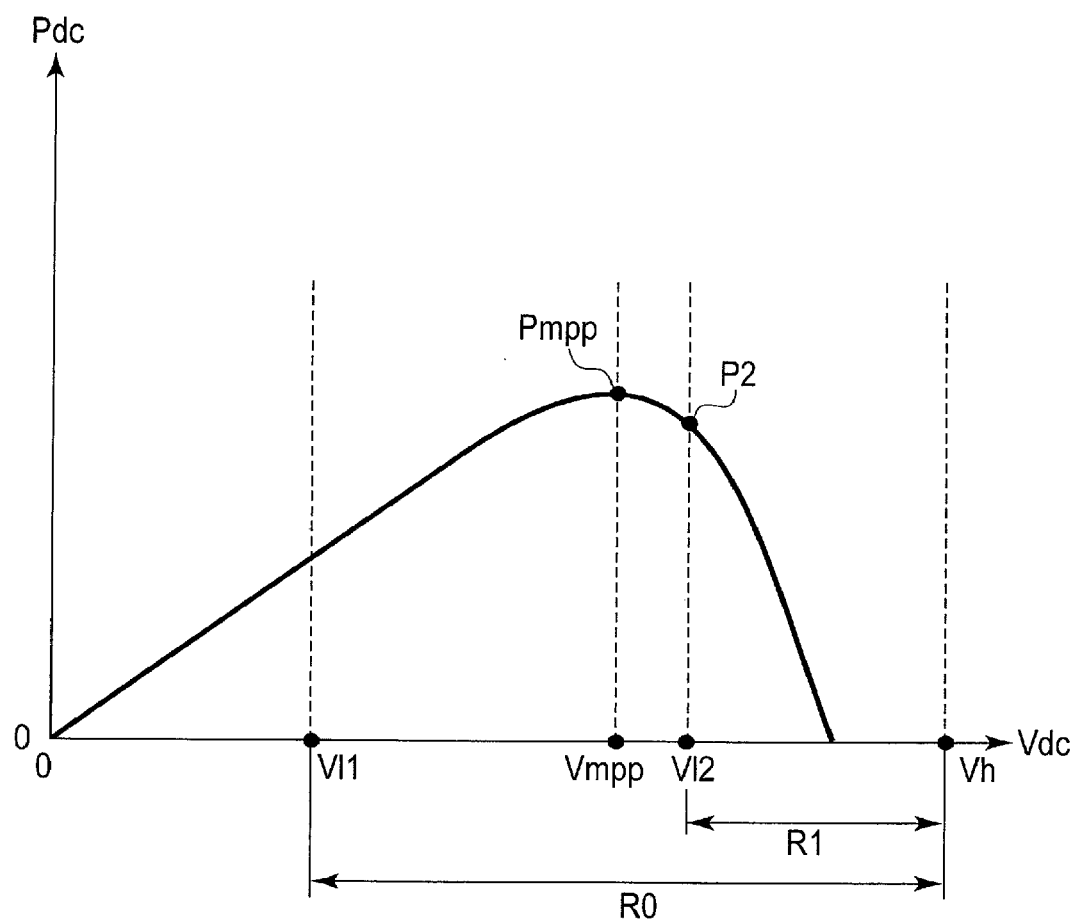
FIG. 5 is a characteristic diagram showing the characteristics of power generated by a photovoltaic cell according to the second embodiment.

With reference to FIG. 5, the control which the DC voltage controller 23A performs when receiving the control signal Sp will be described below. FIG. 5 is a characteristic diagram showing the characteristics of power generated by a photovoltaic cell 3 according to the present embodiment.

When not receiving any control signal Sp, the DC voltage controller 23A controls a DC voltage Vdc in accordance with the maximum power point tracking control by the MPPT 22A. Here, the DC voltage Vdc is controlled within an operation range R0 between a predetermined lower limit voltage Vl1 and a predetermined upper limit voltage Vh. In this case, the DC voltage Vdc is basically controlled to be approximately a voltage Vmpp at a maximum power point Pmpp.

When receiving the control signal Sp, the DC voltage controller 23A switches from the operation range R0 to an operation range R1. The operation range R1 is obtained by increasing the lower limit voltage Vl1 of the operation range R0 set until the receipt of the control signal Sp to a lower limit voltage Vl2. Here, a changed lower limit voltage, namely, the lower limit voltage Vl2 may be set in advance or may be determined on the basis of a system voltage Vr of an AC power system 7.

When the DC voltage Vdc controlled by the maximum power point tracking control is less than the lower limit voltage Vl2, the DC voltage controller 23A controls the DC voltage Vdc to be the lower limit voltage Vl2 regardless of the voltage increase/decrease signal Vn received from the MPPT 22A. In this case, the DC voltage Vdc is controlled on power P2 which is less than the maximum power point Pmpp of the maximum power point tracking control.

On the other hand, when the DC voltage Vdc controlled by the maximum power point tracking control is greater than or equal to the lower limit voltage Vl2, the DC voltage controller 23A controls the DC voltage Vdc based on the voltage increase/decrease signal Vn received from the MPPT 22A in a manner similar to that of the ordinary maximum power point tracking control.

According to the present embodiment, an effect similar to that produced by the first embodiment can be achieved by detecting an output voltage deficiency and distortion of the waveform of the output current Iiv of the inverter 1 and increasing the lower limit voltage of the operation range of the DC voltage Vdc than usual.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A control apparatus for a photovoltaic inverter that converts power generated by sunlight into AC power interconnecting with an AC power system, the control apparatus comprising:
    a system voltage detector configured to detect a system voltage of the AC power system;
    a DC voltage detector configured to detect a DC voltage applied to the inverter;
    an output voltage deficiency detector configured to detect an output voltage deficiency of the inverter based on the system voltage detected by the system voltage detector and the DC voltage detected by the DC voltage detector;
    an output-current detector configured to detect an output current of the inverter;
    an output-current distortion detector configured to detect distortion of the output current based on a harmonic included in the output current detected by the output-current detector;
    a maximum power point tracking controller configured to perform maximum power point tracking control on the inverter; and
    an output-current distortion controller configured to perform control to set the DC voltage applied to the inverter to a voltage at a power point less than a maximum power point of the maximum power point tracking control when the output voltage deficiency is detected by the output voltage deficiency detector and the distortion of the output current is detected by the output-current distortion detector.

2. The control apparatus for the photovoltaic inverter of claim 1, wherein the output-current distortion controller increases the DC voltage until the output voltage deficiency is no longer detected by the output voltage deficiency detector or the distortion of the output current is no longer detected by the output-current distortion detector.

3. The control apparatus for the photovoltaic inverter of claim 1, wherein the output-current distortion controller increases a lower limit of a control range of the DC voltage of the maximum power point tracking control when the output voltage deficiency is detected by the output voltage deficiency detector and the distortion of the output current is detected by the output-current distortion detector.

4. A photovoltaic power system comprising:
    a photovoltaic cell configured to generate power by sunlight;
    an inverter configured to convert the power generated by the photovoltaic cell into AC power interconnecting with an AC power system;
    a system voltage detector configured to detect a system voltage of the AC power system;
    a DC voltage detector configured to detect a DC voltage applied to the inverter;
    an output voltage deficiency detector configured to detect an output voltage deficiency of the inverter based on the system voltage detected by the system voltage detector and the DC voltage detected by the DC voltage detector;
    an output-current detector configured to detect an output current of the inverter;
    an output-current distortion detector configured to detect distortion of the output current based on a harmonic included in the output current detected by the output-current detector;
    a maximum power point tracking controller configured to perform maximum power point tracking control on the inverter; and
    an output-current distortion control configured to perform control to set the DC voltage applied to the inverter to a voltage at a power point less than a maximum power point of the maximum power point tracking control when the output voltage deficiency is detected by the output voltage deficiency detector and the distortion of the output current is detected by the output-current distortion detector.

5. The photovoltaic power system of claim 4, wherein the output-current distortion controller increases the DC voltage until the output voltage deficiency is no longer detected by the output voltage deficiency detector or the distortion of the output current is no longer detected by the output-current distortion detector.

6. The photovoltaic power system of claim 4, wherein the output-current distortion controller increases a lower limit of a control range of the DC voltage of the maximum power point tracking control when the output voltage deficiency is detected by the output voltage deficiency detector and the distortion of the output current is detected by the output-current distortion detector.

7. A method of controlling a photovoltaic inverter that converts power generated by sunlight into an AC power interconnecting with AC power system, the method comprising:

detecting a system voltage of the AC power system;

detecting a DC voltage applied to the inverter;

detecting an output voltage deficiency of the inverter based on the detected system voltage and the detected DC voltage;

detecting an output current of the inverter;

detecting distortion of the output current based on a harmonic included in the detected output current;

performing maximum power point tracking control on the inverter; and performing current distortion control to set the DC voltage applied to the inverter to a voltage at a power point less than a maximum power point of the maximum power point tracking control when the output voltage deficiency is detected and the distortion of the output current is detected.

8. The method of controlling the photovoltaic inverter of claim 7, wherein the performing of the current distortion control includes increasing the DC voltage until the output voltage deficiency is no longer detected or the distortion of the output current is no longer detected.

9. The method of controlling the photovoltaic inverter of claim 7, wherein the performing of the current distortion control includes increasing a lower limit of a control range of the DC voltage of the maximum power point tracking control when the output voltage deficiency is detected and the distortion of the output current is detected.

\* \* \* \* \*